March 21, 1961 A. H. WAKEMAN 2,975,617
AERATING AND REFRIGERATING APPARATUS
Filed Jan. 23, 1958
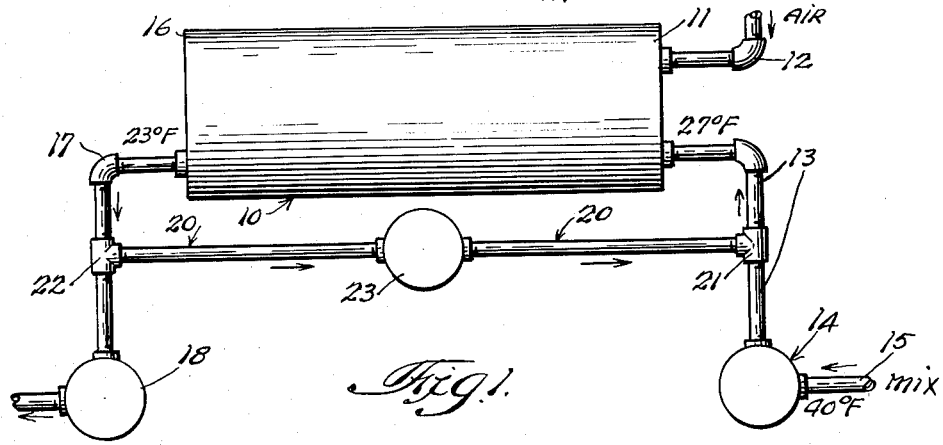
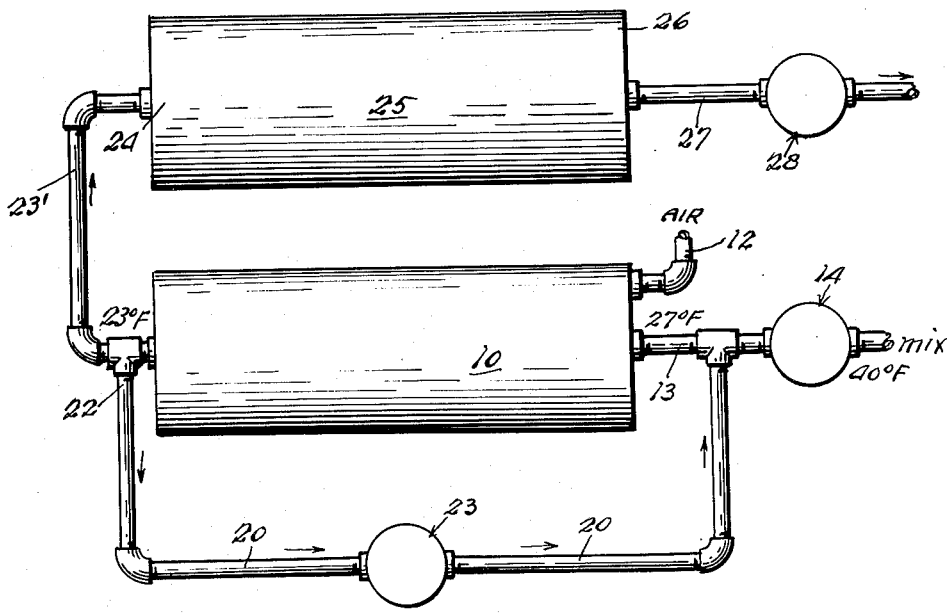
Inventor:
Alden H. Wakeman

United States Patent Office

2,975,617
Patented Mar. 21, 1961

2,975,617

AERATING AND REFRIGERATING APPARATUS

Alden H. Wakeman, Lake Mills, Wis., assignor to The Creamery Package Mfg. Company, Chicago, Ill., a corporation of Illinois Filed Jan. 23, 1958, Ser. No. 710,743

5 Claims. (Cl. 62—342)

This invention relates to an aerating and refrigerating apparatus and, more particularly, to an apparatus of type suitable for use in the continuous production of ice cream or the like.

In the commercial production of ice cream, for example, there exists a real problem in controlling overrun in the product so as to maintain a uniform high quality for the product. By the term "overrun" is meant the percentage of air, or gaseous fluid, in the product.

It has been found that one of the problems encountered in the atttaining of proper overrun control, particularly where the output of the apparatus is large, is to rapidly reduce the temperature of the entering ice cream mix to a point where optimum air incorporation will occur during passage of the mix through the apparatus. The refrigerating capacity of such apparatus is normally limited by physical dimension and/or cost of the apparatus itself. By having a rapid reduction in the temperature of the entering ice cream mix to within the temperature range wherein optimum air incorporation in the mix will occur, more effective break-up of the air particles into minute size and uniform distribution thereof throughout the ice cream mix will be accomplished whereby the palatable character of the product will be materially enhanced. A further advantage to be attained by the rapid and effective break-up of air particles and the uniform distribution of the same throughout the mix, while the latter is passing through the apparatus, is that more efficient heat transfer will result because of more thorough and vigorous agitation obtainable due to the presence of a less dense product formed by the intermixing of the frozen and unfrozen portions of the mix in the apparatus.

Thus, it is one of the objects of this invention to provide an aerating and refrigerating apparatus which is possessed of a large capacity and yet is capable of readily maintaining accurate overrun control.

It is a further object of this invention to provide an aerating and refrigerating apparatus which is not beset with the shortcomings of the prior art and is more efficient and economical in operation.

Further and additional objects will appear from the description, accompanying drawings, and appended claims.

In accordance with one embodiment of this invention, an improved aerating and refrigerating apparatus for a readily solidifiable liquid is provided which comprises an elongated refrigerated chamber through which such liquid flows and is simultaneously aerated. Communicating with the inlet side of the chamber is a feed pump which maintains a substantially uniform rate of flow of the liquid entering the chamber. Communicating with the outlet side of the chamber is a second pump which maintains a substantially uniform rate of flow of the refrigerated and aerated liquid discharged from said chamber. The capacity of said feed, or first, pump is less than that of the second pump. Conduit means is provided having one end thereof communicating with and interposed the inlet side of the refrigerated chamber and the discharge side of the feed pump. The other end of the conduit means communicates with and is interposed the outlet side of the chamber and the intake side of the second pump. Disposed within the conduit means is a third pump which is of such a size as to permit a predetermined amount of the refrigerated and aerated liquid discharged from the chamber to flow through the conduit means and be mixed with the entering mix and recirculated through the chamber.

For a more complete understanding of this invention, reference should be made to the drawing, wherein:

Figure 1 is a fragmentary diagrammatic view of one form of the improved apparatus.

Fig. 2 is similar to Fig. 1, but showing a second form of the improved apparatus.

Referring now to the drawing and, more particularly, to Fig. 1, the improved aerating and refrigerating apparatus therein shown embodies a single elongated refrigerated chamber 10 through which the product to be treated is caused to flow. Connected to one end 11 of the cylinder, in this instance, is a conduit section 12 for introducing a predetermined amount of air or some other suitable gaseous fluid under pressure into the interior of the chamber, so as to effect aeration of the liquid flowing through such chamber. A second conduit 13 is also connected to chamber end 11, so as to permit the liquid to enter the interior of chamber 10. Where the apparatus is adapted for use in producing ice cream, the liquid, heretofore referred to, is intended to mean ice cream "mix." Disposed within conduit 13 is a feed pump 14 which has the suction side thereof connected by conduit section 15 to a source of liquid supply, not shown. Feed pump 14 is preferably a positive type of pump.

Connected to the outlet side 16 of chamber 10 is a discharge conduit section 17, in which is disposed a discharge pump 18. Pump 18 is also preferably of a positive type; however, the capacity thereof is greater than the capacity of feed pump 14, to accommodate the aerated mixture. The discharge pump 18 is adapted to cause the processed product to be delivered to a suitable packaging machine or the like, not shown.

Mounted for rotary movement within the interior of chamber 10 is an elongated dasher, including scraper means, not shown, which is adapted to agitate the liquid while flowing through the chamber and cause the air, being introduced into the chamber through conduit section 12, to be broken up into minute particles and uniformly distributed throughout the liquid.

The improved apparatus also includes a conduit section 20 having the opposite ends thereof, 21 and 22, connected to conduit sections 13 and 17, respectively. The point of connection of end 21 in conduit 13 is interposed the inlet side 11 of chamber 10 and the discharge side of feed pump 14. The opposite end 22 of conduit 20, on the other hand, is interposed outlet side 16 of chamber 10 and the suction side of discharge pump 18.

Disposed within conduit section 20 is a third pump 23, which is adapted to cause a predetermined amount of the processed liquid discharged from chamber 10 to flow through conduit 20 and to admix with the liquid flowing from pump 14 and then be recirculated through chamber 10. The discharged liquid which passes through conduit 20 is at approximately 22° F., the temperature of the product leaving chamber 10. Upon admixing of such 22° F. liquid with the liquid fed by pump 14, the temperature of the latter being at approximately 40° F., the admixture of the two liquids will be at a temperature of approximately 27° F. Decided advantages are to be obtained by the precooling of the entering liquid in a manner as suggested; for example, the air introduced through conduit 12 will be more effectively broken up into minute particles and uniformly distributed throughout the liquid flowing through the chamber because such liquid is in a temperature range for optimum air incorporation. Secondly, by reason of the more uniform distribution of air throughout the liquid, the density of the latter will be reduced, resulting in more efficient heat transfer between the liquid and the refrigerated wall surfaces of the chamber. Lastly, by reason of the reduced density of the liquid, there is less adhesion, or freeze-on, of the product on the interior surface of the chamber. Pump 23, which is disposed within conduit 20 is preferably of a positive type because of the high viscosity of the mix to be moved.

A modified form of the improved apparatus shown in Fig. 2, wherein the apparatus embodies a pair of serially connected refrigerated chambers 10 and 25. Both of the chambers are elongated and of substantially the same length. Chamber 10, feed pump 14, and recirculating pump 23 are substantially the same as that previously described in connection with the apparatus shown in Fig. 1. However, pump 23 may, if desired, be of a centrifugal type because of the fact that there is a relatively small pressure differential between the inlet and outlet sides of the chamber 10 and, also, the liquid being recirculated is sufficiently fluid to be moved by this type of pump, thereby not subjecting such pump to a substantial load. There is a further advantage in using a centrifugal pump in that the recirculated liquid is subjected to added desirable agitation by the pump impeller. Furthermore, conduits 13 and 20 are the same. Chambers 10 and 25 are serially connected to one another by a conduit section 23' which is substituted for conduit section 17, disclosed in Fig. 1. Conduit section 23' has one end thereof connected to the inlet side 24 of chamber 25, and the other end thereof connected to the outlet side 16 of chamber 10. The outlet side 26 of chamber 25 is connected by a conduit 27 to the intake side of a discharge pump 28, which is similar to pump 18, previously described. While the capacity of pump 28 is greater than that of pump 14, a positive pressure is maintained in both chambers 10 and 25 by reason of the air pressure introduced into chamber 10 through conduit section 12. Conduit 20, herefore described in regard to the apparatus of Fig. 1, has the end 22 thereof connected to conduit section 23'. Where more than two serially connected chambers are utilized, it may be desirable to relocate conduit section 20 whereby the latter may have one end connected to the outlet conduit 27 of chamber 25 and the other end connected to the conduit section 13, to cause recirculation of frozen mix to the chamber 10 by means of pump 23.

The liquid, while passing through chamber 10, in either form of the apparatus, is subjected to vigorous agitation by a dasher, not shown, which is mounted for rotary movement within said chamber. Where the liquid discharged from chamber 10 has attained a temperature of approximately 23° F., the temperature of the liquid will be further reduced while passing through chamber 25 in a relatively quiescent state. By utilizing a two-chamber type of improved apparatus in place of the single-chamber type shown in Fig. 1, the former is capable of greater capacity because of the greater refrigerating effect caused by the two chambers. If desired, pump 14, pumps 18 or 28, and pump 23 may be driven from a common power source and the relative speeds thereof accurately regulated.

Thus, an improved aerating and refrigerating apparatus has been provided which is possessed of large production capacity and is capable of maintaining accurate overrun control.

Furthermore, the over-all efficiency of the apparatus is materially improved.

While several embodiments of this invention are shown above, it will be understood, of course, that the invention is not to be limited thereto, since many modifications may be made and it is contemplated, therefore, by the appended claims, to cover any such modifications as fall within the true spirit and scope of this invention.

I claim:

1. An aerating and refrigerating apparatus for a readily solidifiable liquid, comprising an elongated refrigerated chamber through which such a liquid flows and is simultaneously aerated, first conduit means connected to the inlet side of said chamber for effecting introduction of such liquid into said chamber, second conduit means connected to the outlet side of said chamber for effecting removal of aerated and refrigerated liquid from said chamber, third conduit means having one end thereof connected to said first conduit means and the other end thereof connected to said second conduit means, and liquid-impelling means disposed within said third conduit means for effecting continuous recirculation of a portion of the discharged refrigerated and aerated liquid from said second conduit means to said first conduit means whereby said recirculated liquid is intermixed with the liquid initially entering said chamber.

2. An aerating and refrigerating apparatus for a readily solidifiable liquid, comprising an elongated refrigerated chamber through which such a liquid flows and is simultaneously aerated, first pump means communicating with the inlet side of said chamber for effecting a substantially uniform rate of flow of the liquid entering said chamber inlet side, second pump means communicating with the outlet side of said chamber for effecting substantially uniform rate of flow of the refrigerated and aerated liquid from the outlet side of said chamber, conduit means having one end thereof communicating with the outlet side of said chamber and the suction side of said second pump means and the other end of said conduit means communicating with the inlet side of said chamber and the discharge side of said first pump means, and third pump means disposed within said conduit means for effecting continuous recirculation of a predetermined amount of the refrigerated and aerated liquid from said chamber outlet side to said chamber inlet side; the capacity of said first pump means being less than said second pump means.

3. An aerating and refrigerating apparatus for a readily solidifiable liquid, comprising a pair of elongated, refrigerated, serially connected chambers through which such a liquid flows, first pump means communicating with the inlet side of the first of said serially connected chambers for effecting a substantially uniform rate of flow of the liquid entering said first chamber, a second pump means communicating with the outlet side of the second of said serially connected chambers for effecting a substantially uniform rate of flow of the liquid discharged from said second chamber, the capacity of said first pump means being less than that of said second pump means, conduit means having one end thereof communicating with the outlet side of said first serially connected chamber and the other end of said conduit means communicating with the inlet side of said first serially connected chamber and the discharge side of said first pump means, and third pump means disposed within said conduit means for effecting continuous recirculation of a predetermined amount of the liquid discharged from said first chamber from the outlet side of said first chamber to the inlet side of said first chamber.

4. An aerating and refrigerating apparatus for a readily solidifiable liquid, comprising a pair of elongated, refrigerated, serially connected chambers through which such a liquid flows, means communicating with the inlet side of the first of said serially-connected chambers for introducing a gaseous fluid into the interior thereof, first pump means communicating with the inlet side of the first of said serially connected chambers for effecting a substantially uniform rate of flow of the liquid entering said first chamber, a second pump means communicating with the outlet side of the second of said serially connected chambers for effecting a substantially uniform rate of flow of the liquid discharged from said second chamber, the capacity of said first pump means being less than that of said second pump means, conduit means having one end thereof communicating with the outlet of one of the serially connected chambers and the other end of said conduit means communicating with the inlet side of said first serially connected chamber and the discharge side of said first pump means, and third pump means disposed within said conduit means for effecting continuous recirculation of a predetermined amount of the liquid discharged from said first chamber from the outlet side of said first chamber to the inlet side of said first chamber.

5. An aerating and refrigerating apparatus for a readily solidifiable liquid, comprising an elongated refrigerated chamber through which such a liquid flows and is simultaneously aerated, first conduit means connected to the inlet side of said chamber for effecting introduction of such liquid into said chamber, first pump means having the discharge side thereof connected to said first conduit for effecting a substantially uniform rate of flow of the liquid entering said chamber inlet side, second conduit means having one end thereof communicating with the outlet side of said chamber and the opposite end of said conduit means connected to said first conduit means intermediate the inlet side of said chamber and the discharge side of said pump means, second pump means of of a smaller capacity than said first pump means and disposed within said second conduit means for effecting continuous recirculation from said chamber outlet side to said chamber inlet side of a portion of the liquid flowing through the chamber, and outlet means communicating with the outlet side of said chamber and providing an exit for the remaining portion of the liquid flowing through the chamber.

References Cited in the file of this patent

UNITED STATES PATENTS

| | | |
|---|---|---|
| 1,442,945 | Hauk | Jan. 23, 1923 |
| 1,930,570 | Taylor | Oct. 17, 1933 |
| 1,951,365 | Morrow | Mar. 20, 1934 |
| 2,219,656 | Miller | Oct. 29, 1940 |
| 2,253,512 | Fechner | Aug. 26, 1941 |
| 2,740,262 | Stalkup | Apr. 3, 1956 |
| 2,784,565 | Stalkup | Mar. 12, 1957 |